No. 698,823. Patented Apr. 29, 1902.
J. W. DEÜBNER.
TIME RECORDER.
(Application filed Oct. 10, 1901.)
(No Model.) 10 Sheets—Sheet 3.
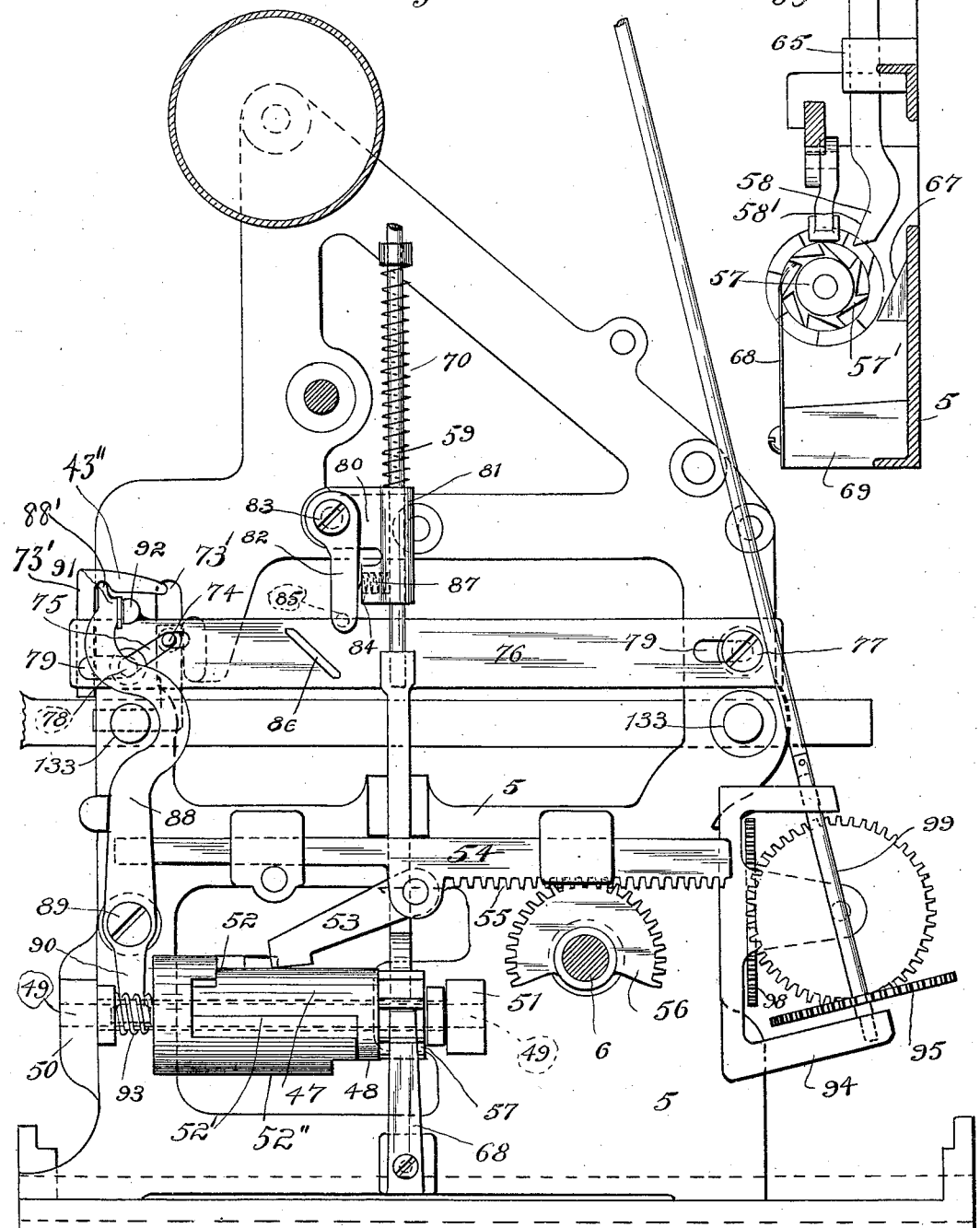
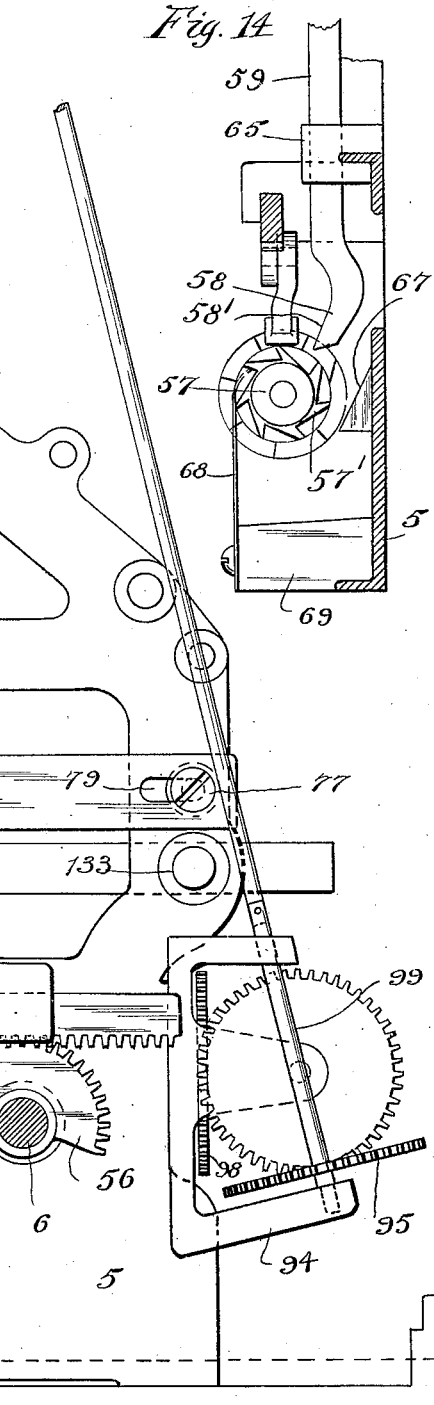
Witnesses:
Jules C. Delanney
E. Hanusch
Inventor
John W. Deübner
By Glenn S. Noble Att'y No. 698,823. Patented Apr. 29, 1902.
J. W. DEÜBNER.
TIME RECORDER.
(Application filed Oct. 10, 1901.)
(No Model.) 10 Sheets—Sheet 4.
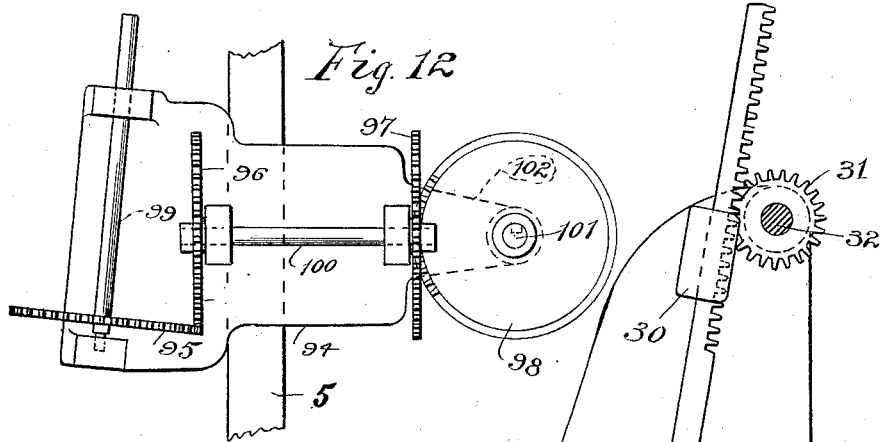
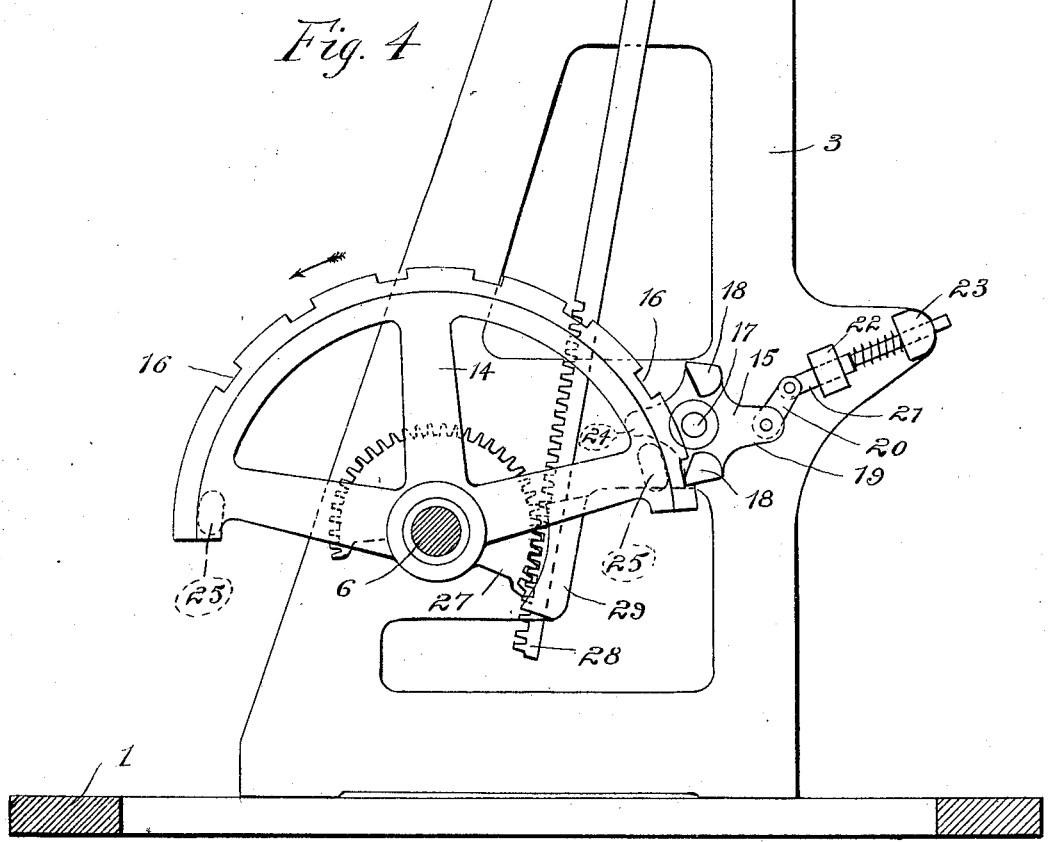
Witnesses: John W. Deübner, Inventor,
Jules C. Delauney By Glenn S. Noble Att'y.
E. Hanusch

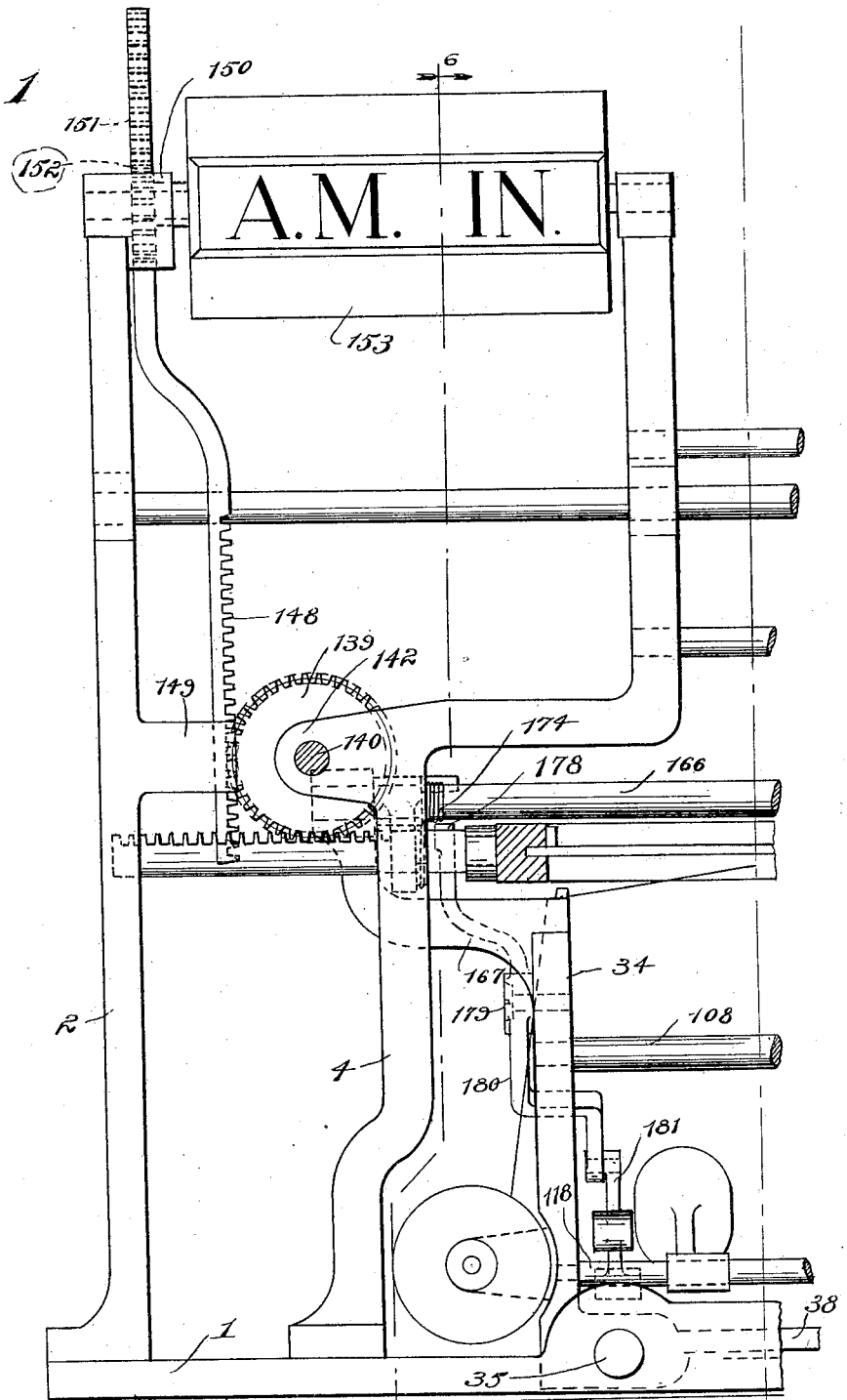

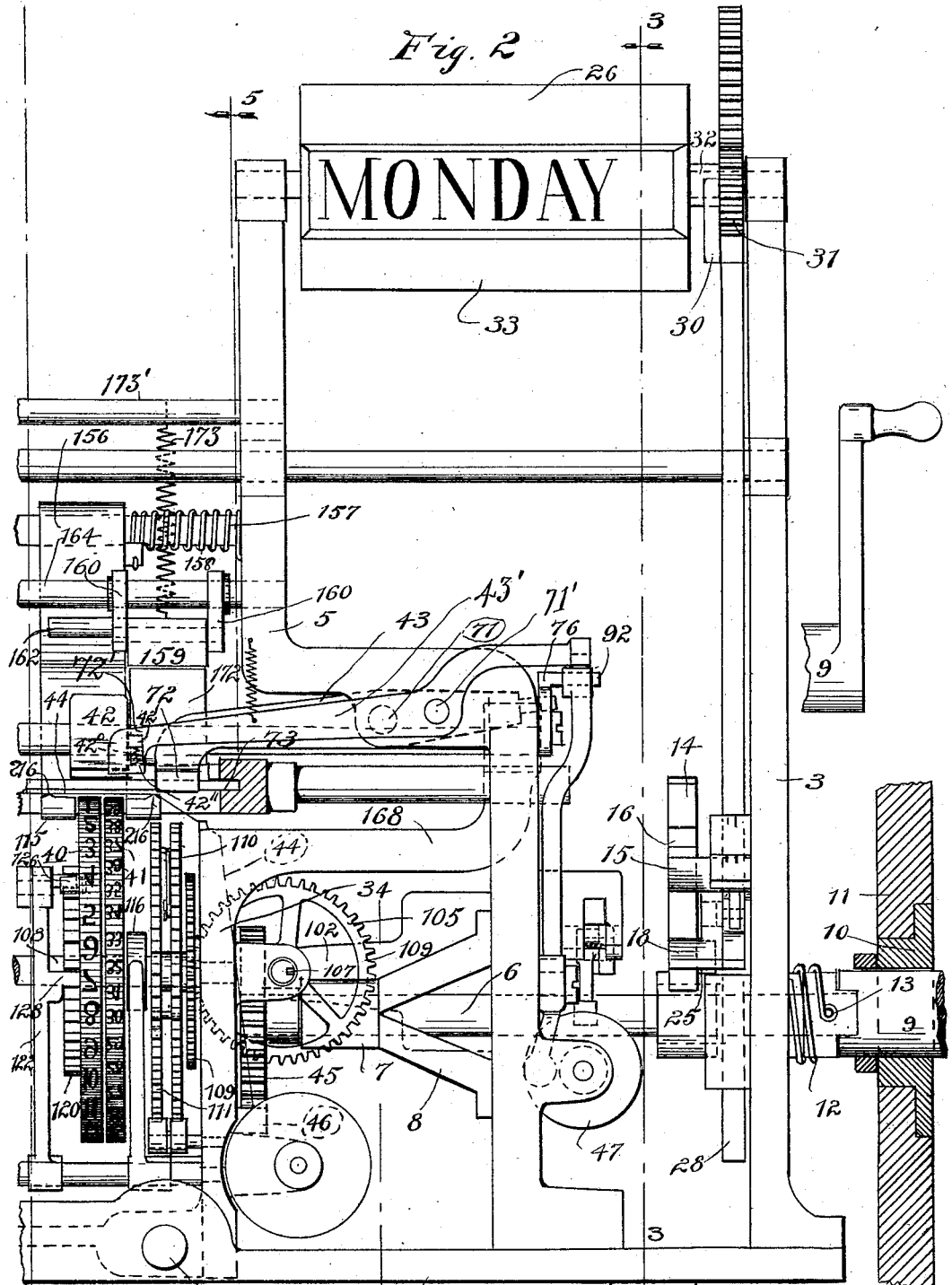

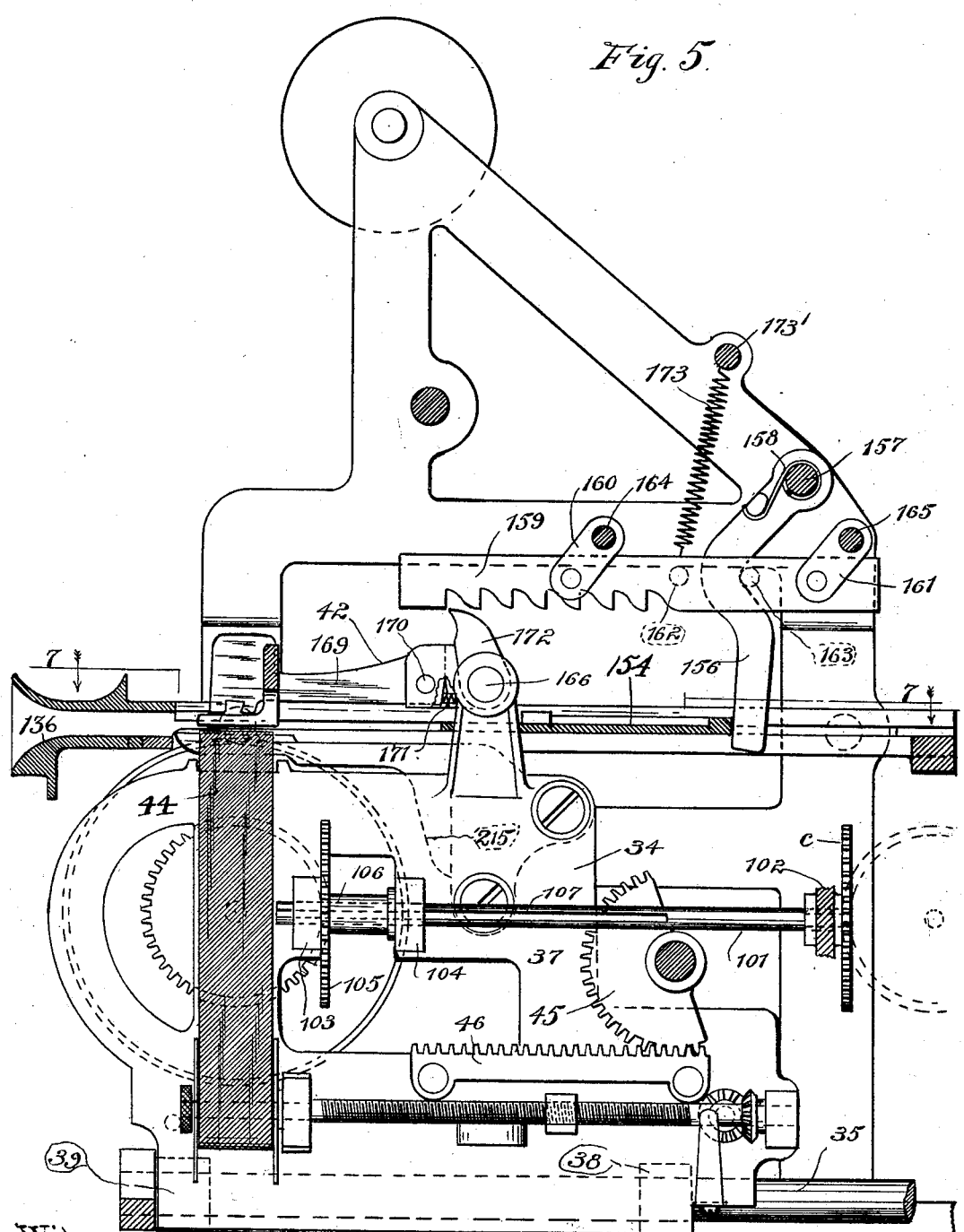

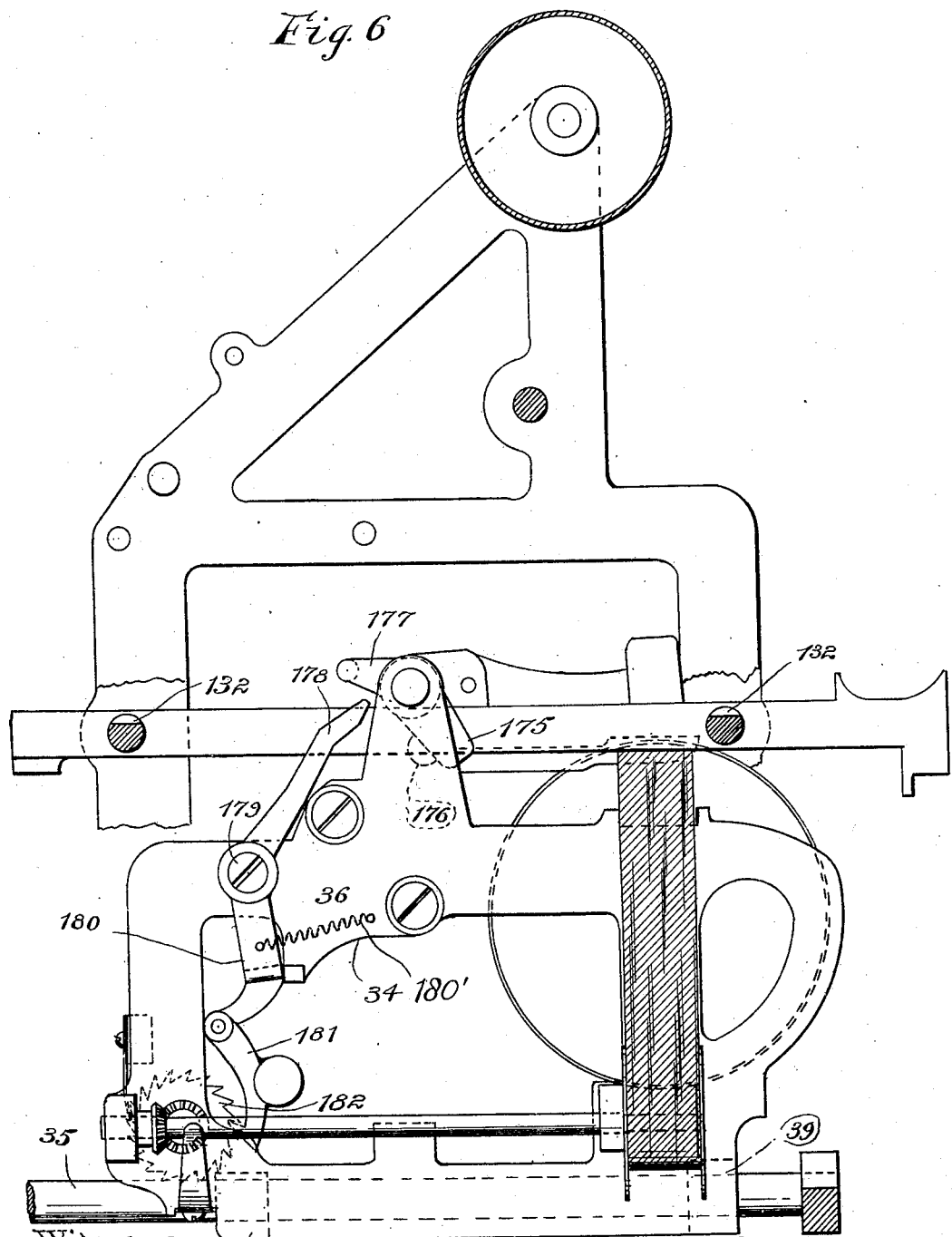

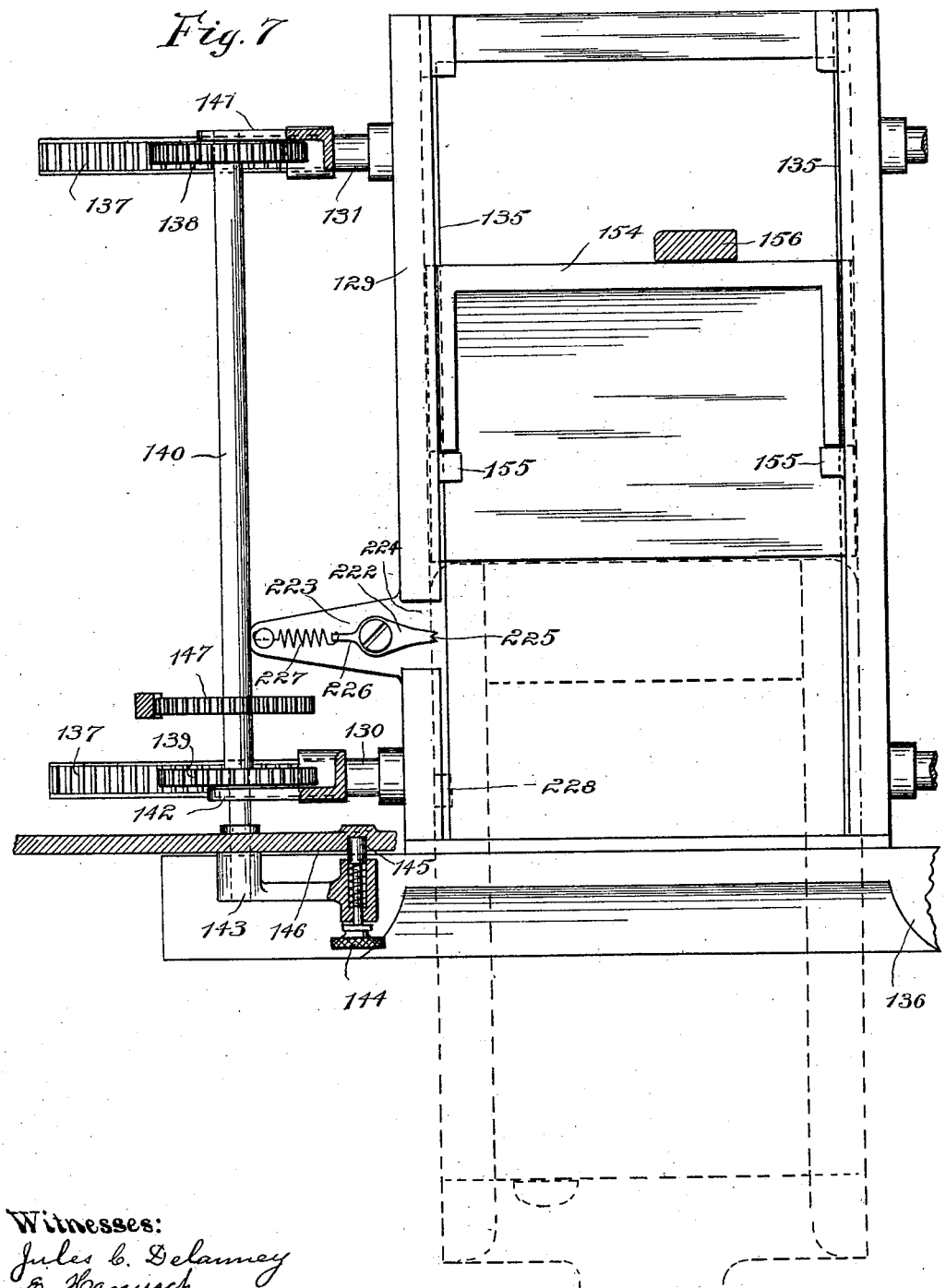

No. 698,823. Patented Apr. 29, 1902.
J. W. DEÜBNER.
TIME RECORDER.
(Application filed Oct. 10, 1901.)
(No Model.) 10 Sheets—Sheet 8.
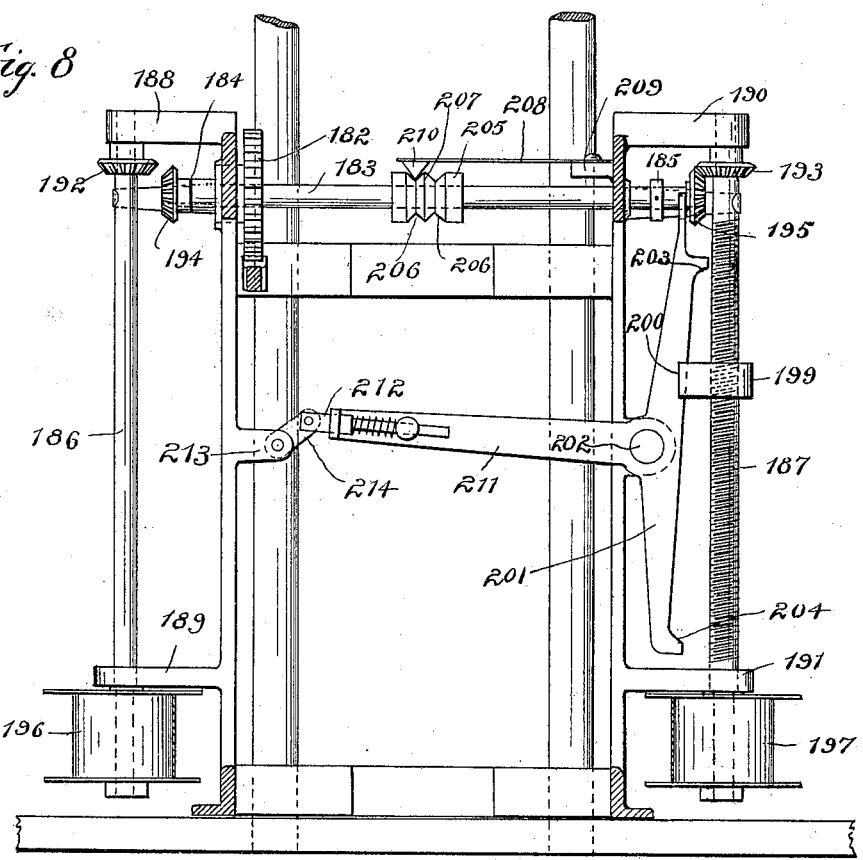
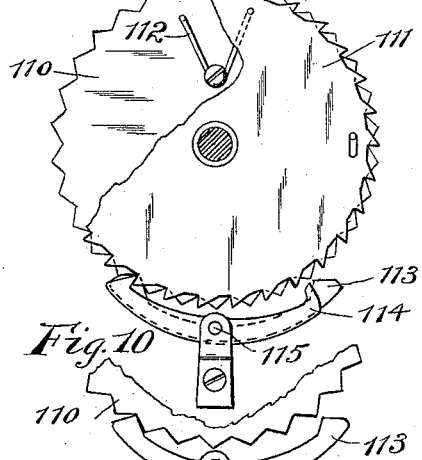
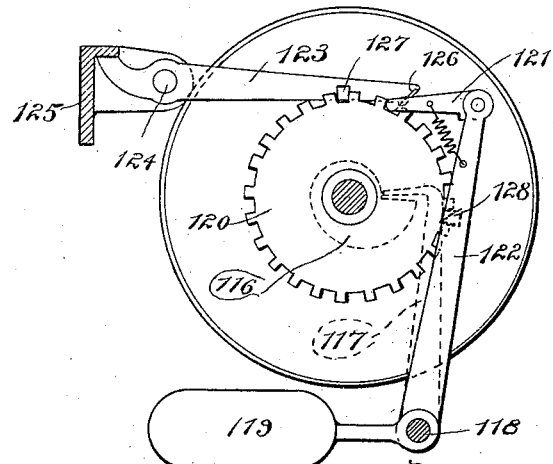
Witnesses:
Jules C. Delauney
E. Hanusch
Inventor,
John W. Deübner
By Glenn & Noble
Att'y.

No. 698,823. Patented Apr. 29, 1902.
J. W. DEÜBNER.
TIME RECORDER.
(Application filed Oct. 10, 1901.)
(No Model.) 10 Sheets—Sheet 9.
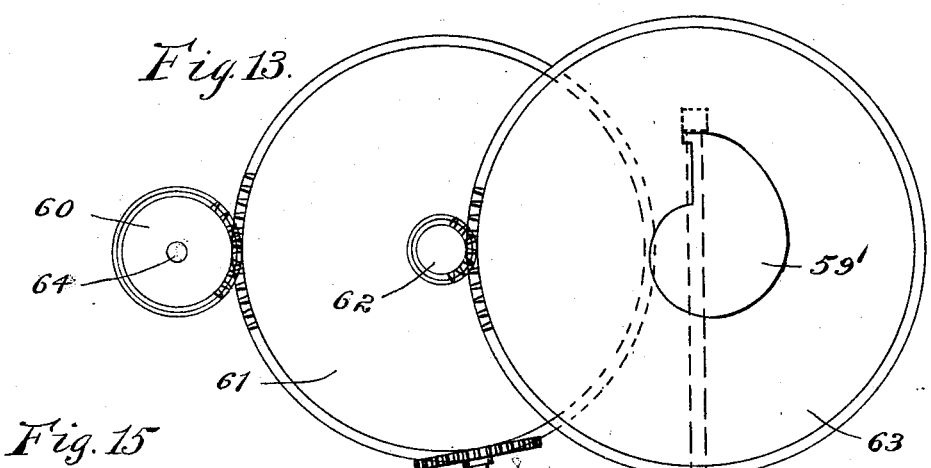
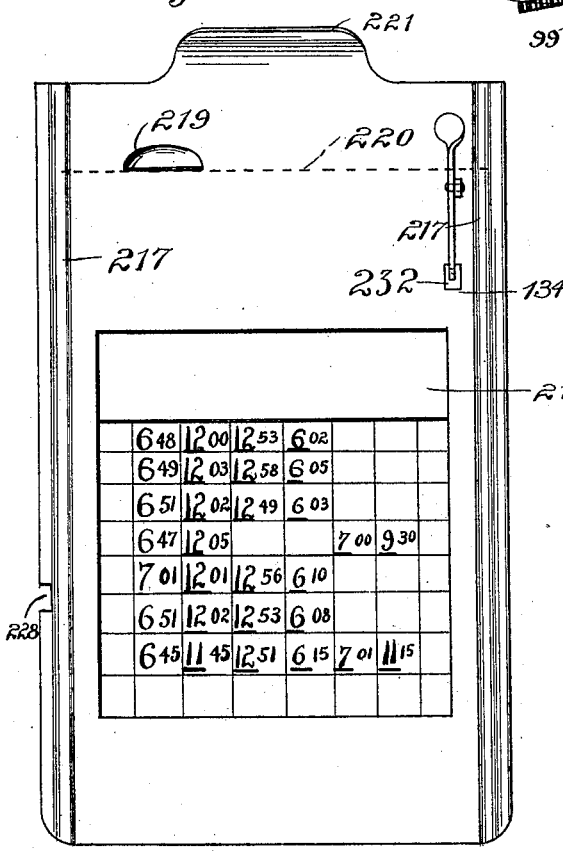
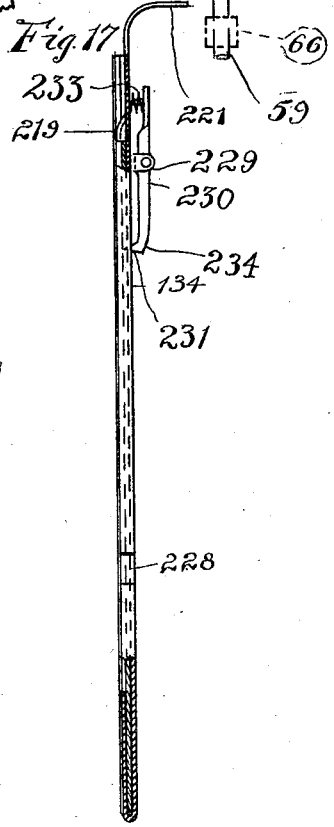
Witnesses:
Jules C. Delauney
E. Hanisch.
Inventor
John W. Deübner
By Glenn S. Noble
Att'y

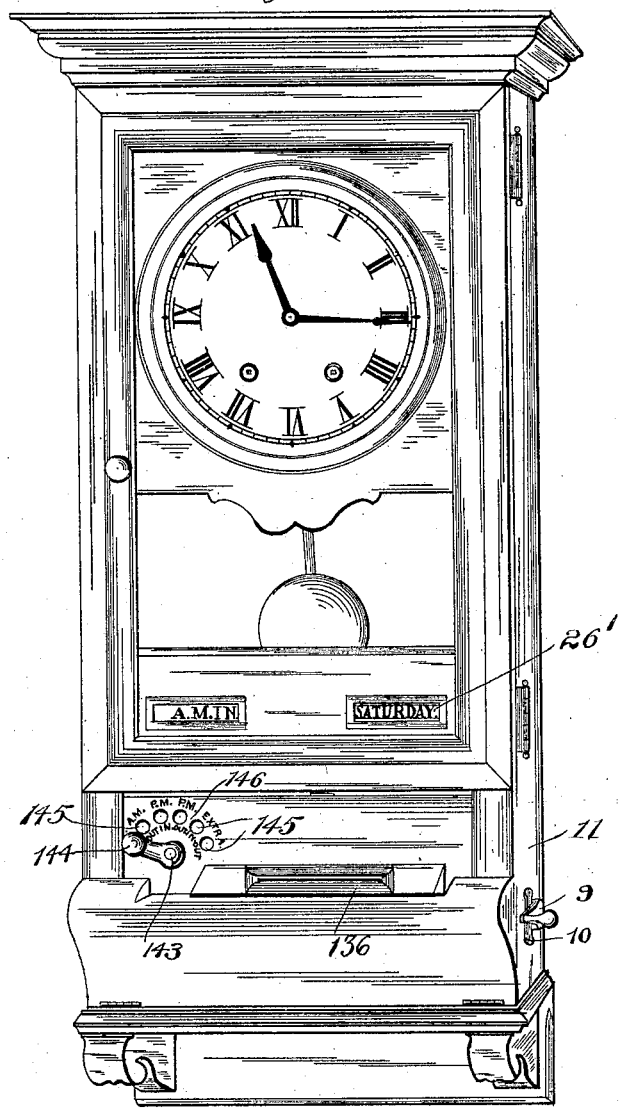

UNITED STATES PATENT OFFICE.

JOHN W. DEÜBNER, OF CHICAGO, ILLINOIS, ASSIGNOR TO INTERNATIONAL TIME RECORDING COMPANY, OF BINGHAMTON, NEW YORK, A CORPORATION OF NEW JERSEY.

TIME-RECORDER.

SPECIFICATION forming part of Letters Patent No. 698,823, dated April 29, 1902.

Application filed October 10, 1901. Serial No. 78,204. (No model.)

*To all whom it may concern:*

Be it known that I, JOHN W. DEÜBNER, of Chicago, in the county of Cook and State of Illinois, have invented certain new and useful Improvements in Time-Recorders, of which the following is a specification.

This invention relates to improvements in time-recorders of that type which are commonly designated "card-machines," or those wherein the registrations of the workmen are made upon cards inserted by the several workmen during the recording operation.

Among the salient objects of the present invention are to provide a machine in which the printing-forms are movable relatively to the card receiver or receptacle within which the card is placed during the recording operation, whereby the succeeding days of the week or times of registration may be indicated upon the card by the position of the impression thereon; to provide means whereby the adjustment of the printing-forms to the several printing positions is accomplished manually; to provide in a machine of the character referred to a shutter mechanism which is operated automatically to close the card-inlet or throat of the machine at the end of predetermined intervals, thereby preventing further registration until the printing-forms have been readjusted; to provide in connection with a shutter mechanism of the character referred to coöperating mechanism rendering it imperative that the printing-forms be adjusted to the correct position corresponding with the given day of the week before the shutter will be opened; to provide in a machine of the character referred to a construction which permits the time mechanism and coöperating parts controlling the shutter to operate continuously without interruption in case one or more days elapse without any registrations being made upon the machine which would require the resetting of the printing-forms; to provide in a mechanism of the character last referred to means whereby the operative member which effects the adjustment of the printing-forms will be locked against further movement as soon as it has been adjusted to the proper day of the week and the shutter thereby opened, but will be free to be operated as many times as necessary to bring it to the said position corresponding with the day of the week; to provide in a machine of the character referred to mechanism coöperating with the form-setting mechanism to set an indicator which displays the day of the week; to provide in conjunction with a machine of the character referred to means for shifting the card-receiver laterally in order to effect the recording of the "In" and "Out" and "A. M." and "P. M." registrations in given spaces and in columns; to provide in conjunction with the mechanism for shifting the card-receiver laterally a coöperating indicator which displays to the workman the position of the card-receiver; to provide in a machine of the general character referred to an improved card-holder, one for each workman's card, adapted to hold the card temporarily or during the allotted time for which a single card is adapted to form a record, which card-holder becomes the operating member which actuates the impression mechanism automatically when inserted in the machine; to provide in a card-holder of this type improved details of construction insuring its more reliable and positive operation and contributing to prevent erroneous registrations, and, in general, to provide simple and improved structural features for embodying the several coöperating instrumentalities in practical, durable, and reliable form.

To the above ends the invention consists in the matters hereinafter described, and more particularly pointed out in the appended claims, and will be readily understood from the following description, reference being had to the accompanying drawings, in which—

Figures 1 and 2 taken together show the main recording mechanism principally in front elevation, but with the receiving end of the card-receiver and that portion of the casing of the machine within which the main crank-shaft is journaled shown in transverse vertical section. Fig. 3 is a longitudinal vertical sectional view taken on line 3 3 of Fig. 2 and looking in the direction of the arrow. Fig. 4 is a view similar to Fig. 3, taken upon the same line 3 3 of Fig. 2 and looking in the opposite direction. Fig. 5 is a longitudinal sectional view taken on line 5 5 of Fig. 2 and looking in the direction of the arrows. Fig. 6 is a view similar to Fig. 5, taken on line 6 6 of Fig. 1 and looking in the direction of the arrows. Fig. 7 is a horizontal sectional view taken on line 7 7 of Fig. 5 and looking downwardly. Fig. 8 is a fragmentary view taken in horizontal section in a plane just above the inking-ribbon-actuating mechanism and showing the latter in plan. Fig. 9 is a detail view of the mechanism whereby the continuously-rotating movement of the clock-actuated member is transformed into a step-by-step movement for actuating the minute-wheel of the recording mechanism. Fig. 10 is a fragmentary view of the parts shown in Fig. 9. Fig. 11 is a view in side elevation of the mechanism whereby movement is transmitted from the minute-wheel to the hour-wheel of the recording mechanism. Fig. 12 is a fragmentary view of the train of gears whereby movement from the clock mechanism is imparted to the recording mechanism, the parts being viewed from the rear side of the machine. Fig. 13 is a fragmentary detail view of the train of gears connected with the clock mechanism whereby the shutter-controlling mechanism is actuated. Fig. 14 is a detailed view of the lower end of the vertical reciprocatory pawl-shaft and parts of the shutter-controlling mechanism actuated by said shaft. Figs. 15 and 16 are plan and end views, respectively, of the card-holder. Fig. 17 is an edge view of the card-holder with parts shown in longitudinal section. Fig. 18 is a perspective view of the complete machine.

Referring to the drawings, 1 designates a suitable base frame member, to which are secured upright side frame members 2 and 3 and intermediate upright frame members 4 and 5, forming the framework upon which the principal parts of the mechanism are mounted, these several members being united to form a rigid framework as a whole.

6 designates a shaft (see Fig. 2) journaled to extend transversely through the frame members 3 5 at the lower right-hand side of the machine, the outer right-hand end of said shaft, which for brevity of description will be hereinafter designated the "main crank-shaft," being journaled directly in suitable bearings in frame member 3, while the opposite end is journaled in a bearing 7, carried by a bracket 8, mounted upon and projecting laterally from the upright frame member 5. The outer end of the shaft 6 is suitably constructed to receive and interclutch with a crank-handle 9, which is removably journaled in suitable bearings 10, mounted in the outer casing 11 of the machine. Upon the outer projecting end of the shaft 6 is mounted a relatively strong coiled spring 12, which tends to rotate said shaft in one direction, in the present instance in the direction indicated by the arrow placed adjacent to the notched segment shown in Fig. 4, one end of said spring being for this purpose attached directly to the shaft 6, as indicated at 13, and the opposite end thereof attached to the adjacent frame member 3.

Referring now more particularly to Figs. 2 and 4, 14 designates a notched segment secured rigidly upon the crank-shaft 6 at a point inside of the frame member 3, and 15 designates a reversible spring-actuated detent adapted to engage the notches 16 of said segment to hold the latter from being returned by the spring 12 when stepped forward. The detent 15 is of novel and peculiar construction, mounted upon a pivot-stud 17 upon the side frame member 3 and arranged to extend through the central portion of the body of the detent, the latter being provided at opposite sides with laterally-projecting pawl-arms 18, made of suitable shape and so arranged as to engage the segment alternately when the detent is oscillated in one direction or the other. The rotation of the crank-shaft 6, as will hereinafter appear, controls the position of the printing-forms or type-wheels, said crank-shaft being rotated forward, step by step, an angular distance equal to the distance between the several notches of the segment 14, one step for each day of the week. In order to hold the detent 15 in such position as to lock the segment against return under the action of the spring 12, said detent is provided at its side remote from the segment with an extension 19, with which is pivotally connected a toggle-link 20, the opposite end of which is similarly engaged with a spring-actuated plunger 21, working through bearings 22 23 upon the side frame member 3, said plunger being arranged radially to the pivotal axis of the detent, so that whichever way the detent is thrown it will be held yieldingly in this position by means of the spring-actuated toggle mechanism. In order to reverse the position of the detent as the segment 14 approaches its limits of oscillation in each direction, said detent is provided, at a point diametrically opposite the extension 19, with a second extension 24, which projects laterally opposite the side of the segment, and upon the latter are formed or mounted two studs or projections 25, one adjacent to each end of the segment-bar and adapted to respectively engage and oscillate the detent into reversed position. In addition to thus holding the detent in either of its positions the spring-actuated toggle mechanism also obviously serves to hold the detent yieldingly in engagement with the segment, so that the latter may be advanced step by step throughout the full length of its throw without interference by the detent.

An indicator (designated 26) is provided which is so interconnected with the crank-shaft as to indicate the position of the segment by displaying the day of the week corresponding to the given notch with which the detent 15 is engaged. In the preferred construction shown herein a gear-segment 27 is mounted rigidly upon the crank-shaft 6, conveniently between the segment 14 and the side frame 3, with which is arranged to intermesh a rack-bar 28, working through a slide-bearing 29, mounted upon said frame member. The rack-bar 28 extends obliquely upwardly and forwardly through a bearing 30, mounted upon the upper portion of said frame member 3, and there engages a gear 31, mounted upon the shaft 32 of the indicator 26. The indicator 26, as shown, consists of a cylindrical shell having a number of portions 33 corresponding to the seven days of the week and suitably inscribed with the same, the shaft 32, upon which said indicator is mounted, being journaled in the upper ends of the frame members 3 and 5. It will be understood that the outer casing will be provided with a sight-opening, located opposite this indicator, so that the latter may be seen, as indicated at 26'.

Describing now the printing-forms, which, as hereinbefore intimated, are shifted bodily from day to day, so as to print upon different portions of the workmen's cards corresponding to the different days of the week, referring more particularly to Figs. 5 and 6, 34 designates as a whole a skeleton frame which is mounted to slide upon parallel ways 35, arranged to extend longitudinally or from front to rear of the machine near the lower part thereof. As will be seen by reference to the several figures of the drawings, and more particularly Figs. 5 and 6, the frame 34 comprises side frame members 36 37, respectively, united by means of lower front and rear cross frame members 38 and 39, respectively, to form a rigid frame structure, suitable bearing apertures being formed in the front and rear lower cross members to rest and slide upon the ways 35. The sliding frame 34 serves to support and carry the two type-wheels 40 41, the mechanism whereby the printing-hammer 42 and the mechanism for operating the same, the inking-ribbon 44 and the mechanism which actuates the latter, as will hereinafter be described in detail.

Describing now the connections whereby the sliding carriage or frame 34 is actuated by the crank-shaft, 45 designates a spur-gear mounted upon the inner end of the crank-shaft 6 and arranged to intermesh with a rack 46, (see Figs. 2 and 5,) which is mounted or formed directly upon the adjacent side frame member 37 of the frame 34 and arranged to extend horizontally from front to rear or parallel with the ways 35 upon which the carriage slides.

Means are provided for controlling the operation of the crank-shaft by the workmen in such manner as to insure that the printing-forms will be adjusted to the proper position to correspond with the day of the week and that they cannot be adjusted to an improper position, such means being constructed and arranged in the present instance as follows:

Referring to Figs. 2 and 3, 47 designates as a whole a cylindrical element which for convenience of description will be hereinafter designated a "controller" and which is operated automatically by the clock movement to control the operation of the crank-shaft and through this the position of the printing-forms. In the preferred form shown, said controller comprises a main cylindric body 48, journaled to both rotate and slide upon a shaft (indicated in dotted lines at 49) and having its opposite ends seated in bearings 50 51 upon the intermediate frame member 5. Upon the cylindric surface of the controller is provided a series of steps or shoulders 52, arranged to extend spirally completely around the circumference of the cylinder and adapted to be engaged by a push-pawl 53, which is pivotally mounted upon a rack-bar 54, interconnected with the crank-shaft by means of a rack 55 upon said bar and a segment 56, mounted rigidly upon the crank-shaft, so that the push-pawl is stepped forward longitudinally of the controller step by step as the crank-shaft is operated by the handle. Upon the end of the controller is provided a ratchet 57, having a number of notches corresponding to the number of steps or shoulders upon the controller, which ratchet is engaged and actuated by means of a pawl 58, formed upon the lower end of a vertically reciprocatory actuating rod or bar 59, (see detail Fig. 14,) the upper end of which is operatively connected with a snail-cam 59', (see detail Fig. 13,) which is actuated through a train of gears 60, 61, 62, and 63, the first of which is mounted upon the minute-hand shaft 64 of the clock-movement. The actuating-rod 59 is arranged to reciprocate through suitable bearings, one (designated 65) being located adjacent to its lower end upon the frame member 5, and the other (indicated in dotted lines at 66) being located adjacent to the snail-cam. In order to prevent overthrowing of the controller under the impetus imparted thereto by the actuating-rod 59, which is dropped suddenly, the ratchet-notches 57' of the ratchet 57 and the acting end of the pawl 58 are of peculiar shape, the pawl being arranged to pass into wedging engagement between an inclined fixed block 67, mounted adjacent to the ratchet, and the rearmost face of the ratchet-notch, as the rod approaches the limit of its downward movement. By reason of this construction it will be seen that the said rear face of the ratchet-notch coming into contact with the inclined and slightly-hooked face portion 58' of the pawl 58 locks the controller positively against movement beyond a given point. In order to prevent the controller from being rotated backwardly or dragged back by the return movement of the actuating-rod, a spring-detent 68 is provided which is mounted upon a suitable support 69, carried by the frame member 5, as indicated clearly in Figs. 3 and 14.

The train of gears which actuates the snail-cam 59 is so proportioned that the snail-cam performs one revolution every twenty-four hours, thereby permitting the actuating-rod 59 to drop or be forced downwardly under the action of a spring 70, and consequently stepping the controller forward one step or notch. The direction of rotation of the controller is such as to constantly carry the series of steps laterally away from the actuating-pawl 53, so that for each step that the controller is rotated the actuating or push pawl must be stepped forward a corresponding step before it will engage that one of the series of steps which is then longitudinally opposite the push-pawl. Obviously, if the pawl is not advanced during a period in which the controller is advanced two or more notches the push-pawl will likewise have to be stepped forward two or more steps before it engages the controller. It may be noted in this connection that the controller is so constructed as to be capable of rotating indefinitely without interference on the part of the pawl 53, being to this end provided with a beveled or inclined surface 52′, extending between the two ends of the spirally-disposed series of cam-steps 52, which serves to lift the end of the pawl upwardly and allow it to ride over the exterior surface 52″ of the controller.

The shifting endwise of the controller by the push-pawl is made the means of operating a shutter mechanism which controls the throat within which the card is inserted by the workman in registering the time thereon, which mechanism will now be described.

Referring to Fig. 2, the shutter 43 consists of a bent bar or lever pivoted between its ends, as indicated at 71, upon the intermediate frame member 5, and having its free end portion 72 arranged to oscillate across the throat or card-opening 73 of the machine. The opposite end of the shutter-bar works in a slot 73′ and is provided with a stud 74, which is arranged to project through an inclined slot 75, (see Fig. 3,) formed through a sliding bar 76, arranged to reciprocate upon guide-studs 77 78 upon the frame member 5, the bar 76 being provided with longitudinally-extending slots 79, within which the said guide-studs are engaged. By reason of this construction it will be seen that when the bar 76 is shifted in one direction or the other the shutter will be correspondingly oscillated into or out of the path of the card-holder and when in the former position will render it impossible for the workman to insert his card of registration. In order to shift the bar 76 to its forward limit, in which position the shutter will be held across the throat of the card-opening, an actuating device (designated as a whole 80) is mounted upon the actuating-rod 59 in position to engage said sliding bar. This actuating device comprises a block 81, sleeved upon the rod 59 and carrying a depending arm 82, which is pivotally connected at its upper end with the block 81, as indicated at 83, and is free to swing away from the actuating-rod 59 at its lower end, but is prevented from swinging toward the rod 59 by engagement with a projection 84 upon the lower portion of the block 81. Upon the swinging lower end of the arm 82 is mounted a laterally-projecting stud or roller 85, adapted to engage an inclined rib 86, fixed upon the sliding bar 76 in such manner as to act upon the rib cam fashion and thrust the bar 76 forwardly during the descent of the actuating-rod in case it has been previously shifted to its rearward position.

The length of the rib 86 and its inclination are such that when the actuating-rod reaches the limit of its downward movement the engaging stud 85 will pass out of engagement with the lower end of the inclined rib, and the stud will engage the under side of the rib 86, and the arm will be thereby swung outwardly until it reaches the upper end of the rib, when it will again return to its normal vertical position. Inasmuch as the arm 82 is free to swing outwardly, it will be obvious that the sliding rod 76 will not be shifted by the upward or return movement of the arm.

In order to insure that the arm 82 shall engage the inclined lower surface of the rib 86, a coiled expansion-spring is arranged within a socket in the lower part of the block 80, as indicated in dotted lines at 87, in such manner as to swing the arm outwardly a short distance.

Inasmuch as the position of the shifting bar 76 is at the rearward limit of its movement when the shutter is opened, it will be obvious that at the end of each twenty-four-hour period at the time when the actuating-rod 59 is dropped the shifting bar will be thereby forced to its forward limit, thus placing the shutter in position to close the throat of the machine until it has again been set.

In order to return the bar 76, and thereby open the shutter, a lever 88 is provided, pivoted between its ends, as indicated at 89, in upright position upon the frame member 5, with its lower end 90 projecting downwardly opposite and adjacent to the end of the controller and with its upper end 91 in position to engage a stud or projection 92 upon the sliding bar 76. The relative arrangement of the controller-lever 88 and sliding bar 76 is such that when the controller is forced endwise forwardly a step by the push-pawl 53 the sliding bar will be shifted to its rearmost position, at which point it will be arrested positively by the engagement of the ends of its guide-slots 79 with the studs upon which it slides, thereby at the same time positively limiting the further movement of the controller. Inasmuch as the push-pawl 53 is directly geared with the crank-shaft, which carries the notched segment 14, it will thus be obvious that after the shutter has been closed the segment will likewise be arrested in position for its coöperating detent 15 to engage the proper notch thereof. The controller is returned to its normal retracted position by a coiled spring 93, interposed between its forward end and the adjacent frame member, within which the controller-shaft is journaled, as seen clearly in Fig. 3; but in this connection it will be noted that although the controller is thus returned by the spring the shifting shutter-bar 76 will remain in the rearward position into which it has been shifted until again thrust forward by the actuating-rod.

Describing next the synchronizing mechanism, whereby the time-wheels or printing-forms are rotated synchronously with the clock-movement and are maintained in continuous driving engagement with the latter, notwithstanding the shifting of the printing-forms, 94 designates a bracket (see Figs. 3 and 12) mounted upon the main frame at the rear side of the latter and near the lower part thereof, upon which is journaled a series of gears designated, respectively, 95, 96, 97, and 98. The gear 95 is mounted upon a drive-shaft 99, which extends obliquely upward and forwardly to the clock-movement in the upper part of the case and is there operatively connected with said movement, as best indicated in Fig. 13, so as to be rotated continuously by said movement. With the gear 95 intermeshes the gear 96, which is mounted upon a shaft 100, journaled in the bracket 94 in a position substantially at right angles to the axis of the gear 95 and carries at its opposite end, and the similar gear 97, which in turn intermeshes with the gear 98, mounted upon the outer end of the shaft 101, which is mounted at one end in a bearing formed through an extension 102 of the bracket 94 and at its opposite end in bearings formed in projecting lugs or ears 103 104 upon the side frame member 37 of the printing-form carriage, as best shown in Fig. 5. Upon the shaft 101, (which itself is held against endwise movement by means of the bearing 102,) at a point between the bearing-ears 103 104, is mounted a spur-gear 105, rigidly connecting with a sleeve 106, embracing the shaft and having splined engagement with a spline-groove 107, formed in said shaft, thereby forming a continuous driving engagement between the said shaft and the gear 105, while permitting the latter to move longitudinally along the shaft with the printing-form carriage.

Referring now to Figs. 1 and 2, 108 designates a shaft journaled within the side frame members of the printing-form carriage to extend transversely across the latter, and upon said shaft at a point just inside of the right-hand side frame is loosely mounted a spur-gear 109, arranged to intermesh with the gear 105, hereinbefore described. The gear 109 is rigidly connected with a cam escapement-wheel 110 adjacent thereto, (see detail Figs. 9 and 10,) which escapement-wheel is in turn yieldably connected with a toothed escapement-wheel 111, adjacent thereto and rigidly mounted upon the shaft 108 through the medium of a V-spring 112. With the cam escapement-wheel and the toothed escapement-wheel respectively coöperate a pair of pallet-levers 113 and 114, made rigid with each other and oscillating upon the same pivotal axis, as indicated at 115, these several parts coöperating to transform the continuous rotary movement of the cam escapement-wheel to a step-by-step movement of the toothed escapement in an obvious manner.

41 designates the minute type-wheel mounted rigidly upon the shaft 108, and between said minute type-wheel and the escapement-wheel 111 is rigidly mounted a snail-cam 116, with which coöperates a wiper 117, (see detail Fig. 11,) which wiper is rigidly mounted upon a cross-shaft 118, journaled to extend between the side frame members of the carriage at a point below the type-wheels.

Upon the shaft 118 is rigidly mounted a weighted arm 119, which tends to hold the wiper 117 in yielding engagement with the snail-cam and causes it to follow the conformation of the latter.

Upon the shaft 108, adjacent to the minute-wheel, is loosely mounted the hour-wheel 40, and attached to one side thereof is a ratchet-wheel 120, with which coöperates a push-pawl 121, pivotally mounted upon the upper end of an arm or lever 122, rigidly mounted upon the rack-shaft 118 and therefore moving with the wiper 117.

123 designates a detent likewise acting upon the ratchet-wheel 120, said detent being pivotally mounted upon a stud 124, carried by the cross-frame member 125, extending between the side frames of the carriage at the rear upper part thereof, the forward end of said detent being provided with an obliquely, downwardly, and rearwardly inclined end portion 126, which is engaged by the end of the push-pawl 121 during the advance of the latter in such manner as to lift the detent. At a point between its ends the detent is provided with a laterally-projecting lug 127, which normally rests in engagement with one of the notches of the ratchet-wheel 120, the object of this lug being to hold the hour-wheel positively against advancement by the push-pawl until the detent has been lifted clear of the ratchet-wheel. After the detent has been lifted free from the ratchet-wheel, however, the further movement of the push-pawl rotates the hour-wheel an angular distance equal to the distance from notch to notch. The hour-wheel is prevented from overthrowing under the impetus of the impulse imparted thereto by the push-pawl by means of a detent-lug 128, mounted to project laterally from the arm 122 in position to engage one of the teeth of the ratchet-wheel 120 as the pawl 121 approaches the limit of its advance movement. The lug 127 of the detent 123 likewise serves to prevent the hour-wheel from being dragged back during the gradual return of the push-pawl, the end of the latter being arranged to engage the rear side of the inclined rib 126 and ride upwardly upon and over the same during the return movement of the pawl without lifting the detent.

It will be obvious from the foregoing description that upon each rotation of the minute-wheel the wiper 117 will be caused to perform a sudden advance movement when it reaches the shoulder or drop of the snail-cam and that upon making such movement the associated pawl and detent mechanism acting upon the hour-wheel will step the latter forward a single notch or step and lock it positively in its advanced position, or, in other words, in alinement with the printing position.

Next describing the card-receiver, which, as hereinbefore stated, is so mounted as to be capable of reciprocation laterally relatively to the printing-forms, so as to bring the different columns of the card opposite the printing-forms or type-wheels, referring to Figs. 1, 2, 3, and 7, 129 designates as a whole the card-receiver, which, as best shown in Fig. 7, consists of a rectangular metal frame rigidly mounted on a pair of rack-bars 130 131, which latter are mounted to reciprocate through guide apertures or bearings 132 133, formed in the intermediate frame members 4 and 5, respectively. The card-receiver is suitably constructed to receive a metallic plate-like card-holder 134, (see detail Figs. 15, 16, and 17,) said card-receiver being to this end provided along each side with ways or grooves 135, adapted to receive the side edges of the card-holder and which ways communicate with a throat or entrance-slot 73, formed by a bell-mouthed chute member 136, rigidly united with the forward end portion of the card-receiver. The card-receiver is made in form of a skeleton rectangular frame, open at the center, as indicated clearly in the drawings, so as to expose the principal portion of the card-holder and its contained card when in place within the receiver.

In order to shift the card-receiver laterally, the rack-bars 130 131 are each provided at one end with a rack-section 137, which are respectively engaged by gears 138 139, mounted upon a shaft 140, journaled at its respective ends in bearings 141 142, formed through extensions of the immediate frame member 4, as best indicated in Figs. 1 and 7, the forward end of said shaft being arranged to extend out through the front casing of the machine and being provided with a crank-arm 143, carrying at its outer end a spring-stop adapted to sweep over and engage the openings 145 of an indicator 146, formed concentric with the axis of said shaft 140 upon the outer surface of the casing, as indicated clearly in Figs. 18 and 7.

147 (see Fig. 1) designates a third spur-wheel, mounted upon the shaft 140 and arranged to intermesh with a rack-bar 148, mounted to reciprocate vertically in guide-bearings formed in lugs 149 150 upon the side frame member 2, the upper end of said rack-bar being provided with a second rack portion 151, which intermeshes with a spur-gear 152, mounted upon the journal-shaft of an indicator 153, constructed and arranged, so far as its general features are concerned, substantially like the indicator 26, hereinbefore described. The indicator 146 upon the face of the case and the indicator 153 correspond with each other, the latter and larger indicator being provided in order to display the position of the card-receiver more conspicuously, and both of these indicators being provided with lettering indicating the several positions of the card-receiver by the words "A. M.," "In," "P. M.," "Out," &c.

Describing now the hammer or impression mechanism, referring to Fig. 7, 154 designates a block fitted to slide in the ways 135 of the card-receiver in the rear portion thereof, said block being constructed and arranged to be engaged by the advance end of the card-holder when the latter is inserted and forced backwardly thereby as the card-holder is pushed in. The forward movement of the block is limited by means of a pair of lugs 155, projecting inwardly from the side frame members of the card-receiver, as shown clearly in said Fig. 7. 156 designates a hammer-actuating arm mounted upon a shaft 157, (see Figs. 2 and 5,) arranged to extend between the intermediate frame members 4 and 5 at a point above the card-receiver and near the rear side of the main frame.

The hammer-actuating arm 156 extends downwardly from the shaft 157 in rear of the sliding block 154 and is held under tension, so as to normally force said block outwardly or forwardly by means of a coiled spring 158, coiled about the shaft 157 and having one end attached to the frame member 5 and at the opposite ends operatively connected with the hammer-arm, as indicated clearly in Figs. 2 and 5.

159 designates a notched tripping-bar suspended by means of two pairs of pivoted links 160 and 161, so as to extend from front to rear horizontally above the card-receiver at a point intermediate the length of the hammer-arm 156 and adjacent to the side of the latter. At points immediately in front and in rear of the hammer-arm said tripping-bar is provided with laterally-projecting lugs 162 163, which are engaged by the hammer-arm in the reciprocation of the latter, so as to move the tripping-bar positively with the arm, the arm being curved throughout that portion engaged by said studs, so as to facilitate the freedom of movement of the parts and provide for the sliding engagement incident to the oscillatory movement of the arm and relatively rectilinear movement of the tripping-bar. The links 160 161 are pivotally suspended from cross shafts or rods or supports 164 165, extending between the intermediate frame members, said links being arranged parallel with each other and in such relation to the hammer-arm that during the oscillation of the latter the tripping-bar will be lowered during the first part of the rearward movement of the hammer and elevated during the latter part of its movement, although at all times maintained parallel with the card-receiver.

166 designates the hammer-shaft, which is mounted to oscillate in upstanding projections or yoke-like arms 167 168, (see Figs. 1 and 2,) forming extensions of the side frame members of the printing-form carriage. It may be noted at this point that said yoke-like arms are extended laterally for the purpose of providing for the requisite lateral movement of the card-receiver without interfering with the hammer-shaft support and hammer which overhangs the card-receiver. Upon the hammer-shaft at a point in alinement with the type-wheels is rigidly mounted the hammer, (designated as a whole 42.) In its normal position the head of the hammer stands vertically above the axis of the type-wheels and slightly above the peripheries of the latter, so as to afford freedom of movement therebetween of the inking-ribbon 44. A slight rebounding action of the hammer is provided for by making the latter in two parts jointed together by means of a pivot 170 at a point intermediate of the length of the hammer-helve 169, a slight movement only of one part relatively to the other being provided and the head end member being held yieldably in its rebounding position by means of a coiled spring 171, as indicated in Fig. 5. Upon the hammer-shaft at a point in alinement with the tripping-bar is mounted an upstanding dog 172, adapted for engagement by the said tripping-bar during the movement of the latter under the action of the hammer-actuating arm 156. The upper end of the dog 172 stands in its normal position in a plane just below the points of the teeth of the tripping-bar, so that in its bodily movement with the printing-form carriage these parts do not interfere, and the several teeth of the tripping-bar are so spaced that when the carriage is shifted to its various positions corresponding to the different days of the week the several teeth will respectively stand in the same relation to the dog, that as the tripping-bar begins to descend whichever one of the teeth happens to be opposite said dog will engage the latter and oscillate it rearwardly, thereby raising the hammer, and as the tripping-bar reaches a point in which its supporting-links are carried to a position slightly beyond the perpendicular the tripping-bar will through the influence of a coiled tension-spring 173, extending from a supporting-bar 173' downwardly and attached to the upper side of said bar, be pulled upwardly or caused to complete the remainder of its rearward movement rapidly and the dog thereby released and the hammer allowed to fall. The hammer is thrown downwardly under the impulse of a coiled spring 174, arranged to act upon the hammer-shaft 166, as best indicated in Fig. 1. The hammer will be tripped just prior to the time when the card-holder reaches its rearward limit of movement, so that it will have fully completed its inward movement before the hammer-face comes in contact with the card. The dog 172 is loosely mounted on the shaft 166 and is interclutched with the hammer, which is rigid upon the shaft, by means of a lug 42' on the hammer and recess 42'' in the side of the dog, the width of the recess being greater than that of the lug measured circumferentially of the shaft to provide such lost motion or yielding of the dog as is necessary to permit the tripping-bar to return to position. The dog is held yieldably in upright position by a spring 42°. (See Fig. 2.)

The ribbon mechanism, which is mounted as a whole upon the printing-form carriage, will now be described. Referring more particularly to Figs. 6 and 8, 177 designates an arm fixed rigidly upon the hammer-shaft, in the present instance made integral with the arm 175 and arranged to project substantially oppositely thereto, and 178 designates a bent lever pivoted between its ends upon the side frame of the carriage 34, as indicated at 179. The lower end of the lever 178 is bent inwardly to extend through an opening 180 in the side frame member, and at its extreme lower end it carries a pivotally-connected pawl 181, suitably shaped to engage a ratchet-wheel 182, forming the drive member of the ribbon-gear. The pawl 181 is so weighted as to normally swing toward and engage said ratchet, although free to swing in the opposite direction during its return movement. The lever 178 is returned by a spring 178'. The ratchet-gear 182 is mounted on a shaft 183, journaled to extend through the lower parts of the side frame members of the printing-form carriage at the rear side of the latter, said shaft being so mounted as to be capable of a limited endwise movement and limited in the extent of its movement by means of collars 184 185 upon its respective ends.

186 187 designate two shafts arranged at right angles to the shaft 183 outside of the respective side frame members of the carriage and journaled in suitable brackets or extensions 188 189 and 190 191, formed upon the respective side frame members. Upon the shafts 186 and 187 are fixed bevel-gears 192 193, adapted to respectively intermesh with corresponding bevel-gears 194 195, mounted upon the ends of the transverse shaft 183, the arrangement being such that when either pair of gears are in engagement the opposite pair will be separated.

The shafts 186 and 187 carry at their ends opposite the gears 192 193 ribbon-spools 196 197, the inking-ribbon being arranged to extend from one ribbon-spool upwardly outside of the proximate side frame member to a point in horizontal alinement with the top edges of the type-wheels, thence carried across the upper side of the printing-form carriage between the face of the printing-hammer and the type-wheels and below the plane of the throat of the card-receiver and back at the opposite side of the carriage to the opposite ribbon-spool.

In order to shift the shaft 183 endwise automatically, so as to reverse the direction of movement of the ribbon, the shaft 187 is provided with a screw-threaded portion 198, upon which is threaded a traveler 199, which is provided with a projecting cam portion 200, which engages an oscillatory lever 201, pivoted between its ends, as indicated at 202, the relation of the oscillatory lever to the traveler being such that as the latter travels from one end to the other of the shaft the lever will be oscillated about its pivot. The principal part of this oscillatory movement of the lever takes place when the traveler approaches the respective ends of the lever and engages inclined portions 203 and 204, respectively. That end of the oscillatory lever toward the shaft 183 is bifurcated and arranged to embrace the shaft at a point between the collar 185 and its gear 195, so that the shaft 183 will be shifted positively by the oscillation of the lever, although a certain amount of lost motion is provided, as indicated in the drawings. Upon the central portion of the shaft 183 is mounted a circumferentially-grooved cam-block 205, provided with two grooves 206 and an intervening annular knife-edged rib or bead 207.

208 designates a plate-spring mounted upon a rigid part of the frame, as indicated at 209, and arranged to project adjacent to the cam-block 205, the free end of said plate-spring being provided with a V-shaped cam-block 210, adapted to engage one or the other of the grooves 206, depending upon the direction in which the shaft is shifted, the arrangement being such that when the shaft 183 has been shifted one-half the distance of its throw endwise the spring, acting through the medium of the pointed cam-block and knife-edge beam, will force the said shaft endwise to its opposite limit of movement, thereby throwing its opposite pair of gears immediately into full mesh. This complete and prompt shifting of the reversing-shaft from its intermediate position into full mesh is further facilitated by the action of the oscillatory lever, which is provided with an arm or extension 211, projecting at right angles to the main length of the lever and carrying at its outer end a spring-actuated plunger 212, which is connected with a bracket or extension 213 upon one side frame through the medium of a toggle-link 214, the arrangement being such that when the arm is flexed to a position to bring its toggle-link into and slightly beyond a "dead-center" position the action of the spring will tend to flex the toggle-link in the opposite direction, and thus complete the reversal of position of the parts at once.

Inasmuch as it is desirable that the inking-ribbon be held free from the face of the type-wheels and yet be kept relatively close thereto, so as not to endanger its being engaged by the card-holder when the latter is inserted in the card-receiver, an integral support is provided, consisting of an arm made integral with the cross-frame member 125, said arm being indicated in dotted lines at 215 (see Fig. 5) and extending forwardly below the card-receiver in a plane coincident with the upper edges of the type-wheels, the forward end of said arm being bifurcated and arranged to extend at each side of the respective minute and hour wheels, as seen clearly in Fig. 2. At points laterally opposite the printing-point said arm is provided with slight upstanding projections 216, upon which the inking-ribbon rests, also as indicated clearly in said Fig. 2.

In order to adjust the printing-carriage through the medium of the crank-shaft 6, it is found necessary to shift the crank-shaft and the segment 14, carried thereby, a short distance beyond the point at which the carriage is to be set in order that the locking-pawl 15 may engage the proper notch of the segment, and the slight lost motion incident to the transmission of motion from one member to another also permits the said crank-shaft to be rotated a trifle beyond the exact position of adjustment in which it is locked finally. Inasmuch as the distance between the different horizontal lines of the time-card is relatively small, it is possible, by taking hold of the crank-shaft and forcing the latter forwardly as far as this slight lost motion and necessary play permit, to change the position of the printing-carriage enough to register out of alinement if the registration be made while the crank-handle is thus held at its most forward limit, and although such registration is not sufficiently out of line to make an absolutely erroneous record, still it is desirable to prevent registration in this manner. To this end we have provided an auxiliary shutter mechanism which operates to positively close the throat of the machine whenever the crank-handle is turned far enough to shift the controller 47 forwardly to any appreciable extent. As shown in the present embodiment, this auxiliary mechanism comprises an auxiliary shutter-bar 43', pivoted upon the main frame adjacent to the main shutter-bar upon a pivot-stud 71' and provided at one end with a right-angle projection or extension 43'', (see Fig. 3,) constituting a cam and arranged to overhang the upper end of the oscillatory lever 88. Upon the lever 88 is formed a rounded cam projection 88', which engages the under side of the cam 43'' and positively lifts the latter during the initial part of the backward throw of the lever and retains the cam in uplifted position during the remainder of its throw. The opposite end 72' of the shutter is arranged to normally stand out of line with the throw of the machine, but when lowered by the lifting of its other end by the lever 88 closes the throat. The result of this construction is that should the workman attempt to move the printing-carriage out of position by turning the crank-handle 9 the auxiliary shutter will positively close the slot and prevent such operation, and should he attempt to first insert his card-holder before trying to move the printing-form the card-holder would itself, by locking the auxiliary shutter against movement, prevent the movement of the printing-form.

It now remains to describe the card-holder member specifically and means whereby proper operation of the latter is insured.

Referring to Figs. 15, 16, and 17, the card-holder is shown as formed of two integral plates of sheet metal, one of which is folded upon the other in such manner as to unite the two and form lateral grooves or ways 217 at the opposite sides of the holder, adapted to receive the edges of a card inserted endwise therein. The card-holder is of rectangular form to correspond to the card-receiver and is open at its center, as indicated at 218, to expose that portion of the card upon which the registrations are placed, both above and below, as indicated clearly in Fig. 15. The forward ends of the card-slots are closed, so as to limit the inward movement of the card within the holder, and in order to prevent the unintentional outward movement of the card a stop or boss 219 is struck up from the main body of the holder at a point just in rear of the outer edge of the card, the position of which edge is indicated in dotted lines at 220. The outer end of the card-holder, which is grasped by the workman, is desirably provided with a lift or finger-hold 221, against which the pressure of the thumb may be exerted to force the card-holder into the throat of the machine to operate the recording mechanism.

In order to prevent the withdrawal of the card-holder before it has been inserted far enough to effect a registration, a locking-dog 222 is pivoted upon an extension 223 at one side of the card-receiver frame and arranged to work through an opening 224, leading into the way 135, within which edge of the card-holder travels. The dog 222 is provided with a relatively double sharp knife-edge 225, adapted to bite into the edge of the card-holder whenever an attempt is made to draw the latter in a direction opposite that toward which the dog is inclined, and is provided at its ends opposite the knife-edges with a projection 226, to which is attached a coiled tension-spring 227, which holds the dog normally projected into the path of the card-holder. When, however, the latter is inserted, the dog is oscillated out of its way and assumes an inwardly and rearwardly inclined position and slides along the edge of the card-holder freely until the latter has been fully inserted, at which time a notch or recess 228, formed in the edge of the holder, is brought into register with the point of the dog and permits the latter to return to its normal position at right angles to the edge of the holder. The withdrawal or return movement of the card-holder oscillates the dog in the opposite direction and permits the holder to be withdrawn freely.

In order to prevent tampering with the card while within the card-holder—as, for example, to prevent the workman from partially withdrawing the card from the holder and then registering with the card in improper position, either for the purpose of beating the machine and recording erroneously or otherwise—an auxiliary device is provided, which serves to puncture the card the first time the card-holder is inserted to register and is so arranged as to repeat the puncturing movement each time a registration is made, so that in case the card were moved a plurality of punctures would result corresponding to the different positions of the card in the card-holder. In the preferred construction of this device shown, 229 designates a pivot-lug upon the lower side of the card-holder adjacent to the handle end thereof, upon which is pivoted a puncturing-lever 230, provided with a bent or pointed end 231, adapted to protrude within an opening 232 formed through the card-holder at a point opposite the card when the latter is in proper position within the receiver. Between the opposite end of the puncturing-lever and the proximate face of the card-holder is interposed a coiled expansion-spring 233, which tends to hold the pointed end of the device normally pressed into the aperture 232. The forward or pointed end of the puncturing device is beveled or rounded slightly, as indicated at 234, and is so located with relation to the bell-mouthed chute 136 that when the card-holder is inserted within the latter and approaches its inner limit of movement the end of the puncturing device will be engaged by the chute and forced into and through the card within the holder, thereby puncturing the latter. Obviously if the card remains in the same position within the holder the succeeding registrations will cause the puncturing device to enter the same aperture in the card; but should the card be moved within the holder and the attempt made to register thereon, an additional puncture differently located would be formed, and this would at once disclose the fact that the time had been improperly recorded.

The operation of the device constructed as described is probably entirely obvious from the foregoing description, but may be briefly described as follows: The clock having been properly set and the printing-forms adjusted to correspond, the shutter will remain open until the end of the twenty-four-hour interval, the clock being ordinarily set so as to automatically close the shutter at twelve o'clock midnight. The operation of recording is substantially identical with that of that type of key-machines heretofore in common use in which the recording operation is completely accomplished by the simple direct insertion and withdrawal of the key—that is to say, in the present machine the workman simply adjusts the indicator-crank 143 to correspond with the time he is recording and then pushes his card-holder into the machine until the impression mechanism has been operated and a record thereby made upon his card and then withdraws it, it being understood, of course, that each workman is provided with an individual card-holder and card therefor. At the end of the twenty-four-hour period the clock mechanism will automatically close the shutter, thereby preventing further registrations until the shutter has been opened, which is accomplished by shifting the crank 9. Should the workman operate the crank 9 during the twenty-four hours next succeeding that at the end of which the shutter was closed, he will simply need to move the crank-handle one step, whereupon the pawl 53, carried by the rack-bar 54, intergeared with the crank-shaft, will engage the rotary controller, and thereby open the shutter through the medium of the lever 88 in the manner hereinbefore fully described. As the shutter reaches its fully-open position the endwise movement of the controller will be positively arrested, thereby likewise arresting the movement of the crank, and inasmuch as the printing-carriage is intergeared with the crank-shaft the latter will also be arrested and the detent 15 will serve to lock it against returning under the influence of the coiled spring 12. During the arrangement of the printing-forms through the medium of the crank 9 indicator at the right-hand side of the machine, showing the days of the week, will likewise be adjusted to correspond in the manner hereinbefore fully described. The arrangement of the printing-forms from day to day will be simply repetitions of the foregoing operation until the end of the week, it being noted that the first workman who attempts to register upon the machine after the lapse of a twenty-four-hour period will be compelled to adjust the printing-forms in order to open the shutter so that he may register. At the end of the week, however, when the workman undertakes to open the shutter by turning the crank forwardly the result will be that although the segment will be carried forward until its lug 25 and the rear side of the segment engage and oscillate the locking-pawl 15, nevertheless the shutter will not be opened, for the reason that upon the last step forward of the controller, which occurred at midnight on the preceding day, the pawl 53, which acts upon the controller, was caused to ride up the beveled surface 52' onto the smooth cylindric outer surface without actuating the controller, and consequently without opening the shutter. The locking-pawl having been reversed by the forward movement, the handle and connected segment returns under the influence of the spring 12, acting upon the crank-shaft, to its initial position, again reversing the locking-pawl at the end of its return movement. As the segment thus returns to its initial position the pawl 53 is drawn rearwardly until it drops in behind the first shoulder of the spiral series of shoulders upon the controller. The operator now makes a second forward movement of the crank-handle, which results in opening the shutter by forcing the controller forwardly; but the controller is arrested before the segment has been oscillated far enough to permit the locking-pawl to enter the second notch, so that the handle is released by the operator, it returns to the first notch of the segment, and remains in this position during the first day. It may be noted in this connection that the auxiliary shutter mechanism, hereinbefore described, becomes an important safeguard during this reversing movement of the crank and during its return, since the auxiliary shutter will always be closed during the time the crank is acting upon the lever 88 through the intervening mechanism, and consequently the workman could not register while holding the crank at its forward limit of movement or in that position in which the reversal of the locking-pawl occurs which permits the return of the locking-pawl to its initial position.

It is of course obvious from the preceding description that the printing-forms have continuous driving engagement with the clock-movement through the spline-and-feather connection of the shaft 101 and gear 105, so that the printing-forms or type-wheels will always correspond after being once properly set with the time indicated upon the face of the clock.

The operation of inserting the card and recording consists simply in forcing the card-holder, with its contained card, into the throat and against the sliding block 154, which in turn transmits motion to the arm 156, which operates the tripping-bar 159. As the tripping-bar descends during its rearward motion whichever one of its several teeth or engaging shoulders happens to be opposite, the dog 172 will engage the latter and oscillate it rearwardly, thereby lifting the printing-hammer against the tension of the hammer-spring. As the tripping-bar passes beyond that position in which its supporting-links are perpendicular to the bar the tension-spring 173 will come into action, thereby aiding the return movement of the tripping-bar and lifting the latter free from the dog and permitting the hammer to descend. The several springs obviously return the parts to their normal positions whenever this is permitted by the withdrawal of the card-holder.

The operation, therefore, of recording is reduced to the utmost simplicity, the workman being simply instructed to insert his card by a direct movement, force it inwardly until the hammer has struck its blow, and withdraw it, its withdrawal being facilitated and hastened by the tension of the spring acting upon the arm 156, and thereby forcing outwardly the actuating-block 154. With the exception of those workmen who find it necessary to adjust the crank 143 and the single workman who first records upon the machine during the day the operation of recording is simply the insertion of the card-holder and its instant withdrawal, as above described.

That feature of the machine which compels the workman to adjust the printing-forms manually I deem a feature of utmost importance, not only because of the greater certainty that the printing-form will be properly adjusted, but for the further reason that the work or effort necessary to adjust the printing-form carriage is performed manually instead of being made a load upon the clock-movement, and experience has shown that it is of very great importance to avoid to the greatest possible extent imposing upon a mechanism which is required to keep accurate time the work of operating auxiliary mechanism. In this connection it may be noted that in the present time-recorder the power required to operate all the parts is directed primarily from the operator, except only the operation of synchronizing the printing-forms and controller and closing the shutter. It is to be further noted that the effort necessary to rotate the controller a step once in twenty-four hours is distributed throughout practically the entire twenty-four hours by employment of the snail-cam construction, which operates to lift the actuating-rod which operates the controller gradually and uniformly during each twenty-four-hour period. It will be obvious, therefore, that the driving effort or load upon the clock is to all practical intents uniform at all times. In this connection it is to be understood that throughout the description the various names and terms applied to the elements are to be understood as generic terms, and especially is this true with reference to the terms "shutter," "shutter mechanism," and "controller." While the present embodiment discloses a shutter in the technical sense of that term—i. e., a device which discloses an opening—yet this term is to be understood as comprehending other disabling elements, which are operated automatically to disable the mechanism or prevent its functional operation, whether such means be positive, as in the present embodiment, or negative in the sense that some part is thereby rendered inaccessible for functional operation. It will therefore be understood from the foregoing that while the embodiment shown herein has proven highly efficient in practical use and is deemed the most preferable construction now known to me, yet the invention is capable of embodiment in other forms and the details thereof capable of modification without in any sense departing from the spirit of the invention. I do not, therefore, wish to be understood as limiting myself to the present embodiment except as to those claims specific to such details in their terms.

What I claim, and desire to secure by Letters Patent, is—

1. In combination, a manually-adjustable printing-form automatically operated by a clock-movement and recording mechanism adapted to be operated manually for taking impressions from said printing-form, and means for compelling a properly-correlated operation of said mechanisms comprising a manually-restorable automatic shutter mechanism adapted to render the recording mechanism functionally inoperative at the end of a predetermined interval and a clock-operated controller arranged to control the manual restoration of said shutter mechanism.

2. In combination, mechanism operated automatically by a clock-movement and mechanism operable manually and means for compelling a properly-correlated operation of said mechanism comprising manually-restorable means operating automatically to render the manually-operable mechanism functionally inoperable at the end of a predetermined interval and a clock-controlled synchronized automatic disabling mechanism.

3. In combination, mechanism operated automatically by a clock-movement and mechanism operable manually and means for compelling a properly-correlated operation of said mechanism comprising manually-restorable means operating automatically to render the manually-operable mechanism functionally inoperable at the end of a predetermined interval and a clock-controlled automatic disabling mechanism.

4. In a time-recorder, the combination of a clock-actuated printing-form, a card-receiver, means for moving the printing-form manually relatively to the card-receiver, a shutter mechanism automatically operating to prevent registration at the end of a given interval of time, and interconnections between said shutter mechanism and manually-movable printing-form, whereby the adjustment of the printing-form to the proper printing position effects the opening of the shutter mechanism.

5. In a time-recorder or analogous machine, a mechanism for controlling a shutter or the like, comprising a clock-actuated rotary element having a stepped series of shoulders, a pawl mounted upon a carrier adapted to be advanced step by step and adapted to engage the shoulders of said rotary element to shift the latter, and operative connections between the rotary element and the shutter whereby the shifting of the former operates the shutter.

6. In a time-recorder or analogous machine, means for controlling registrations upon said machine comprising a shutter mechanism, a clock mechanism automatically operating said shutter mechanism, a coöperating mechanism adapted to be set manually and operative connections between said coöperating mechanism and said shutter mechanism, whereby the setting of the former operates the latter.

7. In a time-recorder or the like, the combination of a shutter mechanism, a clock mechanism actuating said shutter mechanism automatically, a clock-actuated element for controlling one of the operations of said shutter, synchronizing mechanism whereby said controlling element is moved by the clock mechanism and means for operating said shutter mechanism manually through the medium of said controller.

8. In a time-recorder or the like, a clock mechanism, a shutter mechanism operated to close automatically at the end of a predetermined interval, a shutter-controlling element, synchronizing mechanism whereby said controlling element is moved regularly with the clock-movement, a manually-operable member arranged to act upon said shutter-controlling element to operate the shutter mechanism through said controlling element, said shutter-controlling element being arranged to recede relatively from the manually-operable element regularly in proportion to the period of time elapsed between operations, and a coöperating instrumentality connected with and adapted to be set by the advance of the manually-operated element.

9. In a time-recorder or the like, a clock mechanism, a shutter mechanism operated to close automatically at the end of a predetermined interval, a rotary shutter-controlling element, synchronizing mechanism whereby said controlling element is rotated regularly with the clock-movement, a manually-operable member arranged to act upon the shutter-controlling element to operate the shutter mechanism through said controlling element, said shutter-controlling element being provided with a spirally-arranged part adapted for engagement by the manually-operable element, and extending entirely around said element, whereby the regular rotation of said element causes said spirally-disposed part to recede from the manually-operable element continuously until a complete revolution is formed and repeats this operation during each cycle of movement of said rotary element.

10. In a time-recorder or the like, a clock mechanism, a shutter mechanism operated to close automatically at the end of a predetermined interval, a rotary shutter-controlling element, synchronizing mechanism whereby said controlling element is rotated regularly with the clock-movement, a manually-operable member arranged to act upon the shutter-controlling element to operate the shutter mechanism through said controlling element, said shutter-controlling element being provided with a spirally-arranged part adapted for engagement by the manually-operable element, and extending entirely around said element, whereby the regular rotation of said element causes said spirally-disposed part to recede from the manually-operable element continuously until a complete revolution is formed and repeats this operation during each cycle of movement of said rotary element, and a coöperating mechanism operatively connected with said manually-operable element and adapted to be set by the manual operation of the latter to operate the shutter.

11. In a time-recorder or analogous machine, means for controlling registrations upon said machine, comprising a shutter mechanism, a clock mechanism arranged to operate said shutter mechanism automatically, a rotary shutter-controlling element having a cylindric portion provided with a spirally-disposed series of shoulders encircling said cylindric portion, a synchronizing mechanism whereby said shutter-controlling element is stepped forward regularly with the clock-movement, a manually-operable pawl arranged to traverse said shutter-controlling element in a direction transversely to its direction of rotary movement, means for stepping forward said pawl step by step, a printing-form movably mounted upon ways and operative connections between said manually-operable pawl and said printing-form whereby the printing-form is moved synchronously with the movement of the pawl and to a corresponding extent.

12. In a time-recorder or analogous machine, means for controlling registrations upon said machine, comprising a shutter mechanism, a clock mechanism arranged to operate said shutter mechanism automatically, a rotary shutter-controlling element having a cylindric portion provided with a spirally-disposed series of shoulders encircling said cylindric portion, a synchronizing mechanism whereby said shutter-controlling element is stepped forward regularly with the clock-movement, a manually-operable pawl arranged to traverse said shutter-controlling element in a direction transversely to its direction of rotary movement, means for stepping forward said pawl step by step, a printing-form movably mounted upon ways and operative connections between said manually-operable pawl and said printing-form whereby the printing-form is moved synchronously with the movement of the pawl and to a corresponding extent, and a stop arranged to positively limit the advance movement of the pawl beyond that step which affects the operation of the shutter.

13. In a time-recorder, or like, a clock mechanism, a shutter mechanism, operated to close automatically at the end of a predetermined interval, a rotary shutter-controlling element, synchronizing mechanism whereby said controlling element is rotated regularly with the clock-movement, a manually-operable member arranged to act upon the shutter-controlling element to open the shutter mechanism through movement imparted to said shutter-controlling element, said shutter-controlling element being provided with a spirally-engaged part adapted for engagement by the manually-operable element, so disposed relatively to the direction of movement of said manually-operable element as to recede there-from during the rotation of the shutter-controlling element, a printing-form movably mounted upon ways, operative connections between said printing-form and said manually-operable element whereby the printing-form is moved with the manually-operable element, and a ratchet mechanism arranged to control the operation of said manually-operable element, said ratchet mechanism being arranged to prevent return movement of the manually-operable element until a complete cycle of movement has been performed.

14. In a time-recorder or the like, a clock mechanism operated to close automatically at the end of a predetermined interval, a rotary shutter-controlling element, synchronizing mechanism whereby said controlling element is rotated regularly with the clock-movement, a manually-operable element, and a ratchet mechanism arranged to control the operation of said manually-operable element, comprising a notched segment, a reversible pawl arranged to act upon said segment, and a reversing mechanism arranged to reverse said pawl at the end of the throw of the segment in each direction.

15. In a time-recorder, the combination of a clock mechanism, a shutter mechanism operated by said clock mechanism to close automatically at the end of a predetermined interval, a rotary shutter-controlling element provided with a cylindric portion encircled by a series of shoulders arranged spirally thereon, said shutter-controlling element being mounted to reciprocate endwise or in the direction of its axis of rotation, a rack-bar arranged to reciprocate parallel therewith, and a pawl carried by said rack-bar and adapted to engage said shutter-controlling element, a crank-shaft provided with a gear operatively engaging said rack-bar, a printing-form movably mounted upon ways and carrying a rack, gear connections between said shaft and the rack of said printing-form, a shiftable member operatively connected with said shutter mechanism and adapted to be engaged by the advance movement of the shutter-controlling element and shifted to open the shutter, synchronizing mechanism connecting said shutter element and said clock-movement whereby said element is rotated regularly and synchronizing mechanism connecting said printing-form with said clock-movement.

16. In a time-recorder, the combination with the main frame of a clock-movement, a printing-form carriage mounted to reciprocate upon ways upon said main frame, a set of printing-forms mounted upon said carriage, driving connections between said clock-movement and printing-forms, and a card-receiver mounted to reciprocate in a direction transversely to the direction of movement of the printing-form carriage upon its ways, said printing-form carriage being provided with laterally-divergent upstanding arms, the upper ends of which extend at opposite sides of the card-receiver, a hammer-shaft supported upon said arms above the card-receiver and a printing-hammer operatively mounted upon said shaft, substantially as described.

17. In a time-recorder, the combination with the printing-forms, of a throat or recording-passage arranged to extend adjacent to said printing-forms and means for controlling the insertion of the recording instrument comprising a shutter-bar pivotally mounted between its ends and having one end arranged to oscillate across said throat, a shutter-actuating bar mounted to reciprocate in a direction transversely to the shutter-bar, provided with an inclined cam-slot operatively connected with the latter, an inclined cam projection upon said shutter-actuating bar and a clock-actuated plunger arranged to act upon said inclined cam projection to shift the bar as the plunger is reciprocated and a snail-cam connected with the clock-movement and operating to reciprocate the plunger at regular intervals.

18. In a time-recorder, the combination with the printing-forms, of a throat or recording-passage arranged to extend adjacent to said printing-forms and means for controlling the insertion of the recording instrument comprising a shutter-bar pivotally mounted between its ends and having one end arranged to oscillate across said throat, a shutter-actuating bar mounted to reciprocate in a direction transversely to the shutter-bar, provided with an inclined cam-slot operatively connected with the latter, an inclined cam projection upon said shutter-actuating bar and a clock-actuated plunger arranged to act upon said inclined cam projection to shift the bar as the plunger is reciprocated and a snail-cam connected with the clock-movement, and operating to reciprocate the plunger at regular intervals, said plunger being provided with a cam-engaging wiper pivotally connected with a cam-block forming part of the plunger and held positively against pivotal movement during the advance movement of the plunger but free to oscillate in the opposite direction during the return movement of the plunger whereby the engaging end of the wiper is caused to travel around the cam projection, substantially as described.

19. In a time-recorder, the combination with the main frame and a clock mechanism mounted thereon, of a set of printing-forms mounted to reciprocate upon ways upon said main frame, driving connections between said printing-forms and the clock-movement, manually-operable means for adjusting said printing-forms along said ways and means for controlling the adjustment of the printing-forms and recording upon the machine, comprising a rotary controller provided with a spirally-disposed surface adapted for engagement by an actuating member, operative connections between said controller and the clock-movement whereby the controller is moved regularly and proportionately to the length of time elapsed, means for manually shifting said controller bodily in the direction of its axis of rotation, a shutter-bar pivotally mounted to oscillate across the throat of the recording-aperture, a shutter-actuating pawl mounted to reciprocate in a direction transversely to the shutter-bar and provided with an inclined cam with which the shutter-bar is operatively connected, a second inclined cam upon said shutter-actuating bar, a reciprocatory plunger arranged to act upon said second cam, operative connections between said plunger and the clock-movement whereby the plunger is reciprocated at regular intervals to close the shutter and a lever pivoted between its ends and arranged to be acted upon at one end by the rotary controller during the bodily movement of the latter, and operatively connected with the shutter-actuating bar at its opposite end, whereby the extent of adjustment of the printing-forms upon their ways is controlled by said rotary controller and the shutter is opened automatically during the adjustment of the printing-forms and is automatically closed by the clock-movement at the end of a predetermined interval, substantially as described.

20. In combination, a tripping-dog mounted to move upon ways, and means for actuating said dog for different positions of arrangement along said ways, comprising a tripping-bar having a series of engaging shoulders arranged to extend substantially parallel with the direction of bodily movement of the dog and mounted to move bodily through an arc to approach and recede from the dog, whereby the dog is engaged during the approach of the bar and released during its retreat.

21. In combination, a pivoted tripping-dog mounted to move upon ways, and means for actuating said dog for different positions of arrangement along said ways comprising a tripping-bar provided with a series of engaging shoulders arranged to extend in a direction substantially parallel with the direction of the bodily movement of the dog, and parallel supporting-links pivotally supporting said tripping-bar at separated points whereby the latter is maintained in parallel relation with the ways while moved bodily through an arc to approach and recede from the dog.

22. In combination, a pivoted tripping-dog mounted to move upon ways and means for actuating said dog for different positions of arrangement along said ways comprising a tripping-bar provided with a series of engaging shoulders arranged to extend in a direction substantially parallel with the direction of the bodily movement of the dog, and parallel supporting-links pivotally supporting said tripping-bar at separated points whereby the latter is maintained in parallel relation with the ways while moved bodily through an arc to approach and recede from the dog, and a spring arranged to act upon said bar to cause it to complete the latter part of its functional movement, whereby the tripping-bar is withdrawn from the dog promptly after it passes the "dead-center" position of the supporting-links, substantially as described.

23. In combination, a pivoted tripping-dog mounted to move upon ways and means for actuating said dog for different positions of arrangement along the ways, comprising a tripping-bar having a series of engaging shoulders extending substantially parallel with the ways, parallel links supporting said bar to cause it to move bodily through an arc while maintained parallel with the ways and means for imparting bodily movement to the tripping-bar comprising an arm pivotally mounted at one end and having its intermediate portion arranged to extend between projections upon the tripping-bar, that part of the arm which works through the said projections being curved, substantially as and for the purpose set forth.

24. In combination, a pivoted tripping-dog mounted to move upon ways and means for actuating said dog for different positions of arrangement along the ways, comprising a tripping-bar having a series of engaging shoulders substantially parallel with the ways, parallel links supporting said bar to cause it to move bodily through an arc while maintained parallel with the ways and means for imparting bodily movement to the tripping-bar comprising an arm pivotally mounted at one end and having its intermediate portion arranged to extend between projections upon the tripping-bar, that part of the arm which works through the said projections being curved, a spring-pressed impression-hammer operatively engaged to move with said tripping-dog, a printing-form upon which the impression-hammer operates and a recording-instrument adapted to be inserted between the printing-form and impression-hammer and having a part adapted to engage and actuate the pivoted tripping-bar-actuating arm.

25. In combination, a pivoted tripping-dog and means for actuating the same comprising a tripping-bar mounted to move bodily through an arc to approach and recede from the tripping-dog while maintained in the same relation to the latter and an engaging shoulder upon said bar.

26. In combination with a card-holder, adapted for use in registering upon a recording-machine, a puncturing device mounted thereon, provided with a part arranged to be engaged by a relatively fixed part of the machine to force the puncturing device into a card held within said holder during a registering operation.

27. In combination with a card-holder of the character described, a puncturing device mounted thereon, provided with a part adapted to be engaged by a relatively fixed part of the machine to force the puncturing device into a card held within said holder during the recording operation and a spring acting upon said puncturing device to hold the puncturing portion thereof normally retracted.

28. In a recording-machine, the combination with the machine-frame and a card-holder adapted for insertion within a recording throat or passage in said frame, of a dog pivoted adjacent to said throat, provided at its engaging end with a plurality of knife-edges adapted for engagement with the card-holder and means for holding said dog yieldingly in position to project into the path of the card-holder, substantially as and for the purpose set forth.

JOHN W. DEÜBNER.

Witnesses:
HARLOW E. BUNDY,
JOSHUA W. W. CAPEE.